A. R. BULLOCK.
METHOD OF RUNNING A SYNCHRONOUS MOTOR.
APPLICATION FILED AUG. 2, 1912. RENEWED SEPT. 20, 1916.
1,223,472. Patented Apr. 24, 1917.
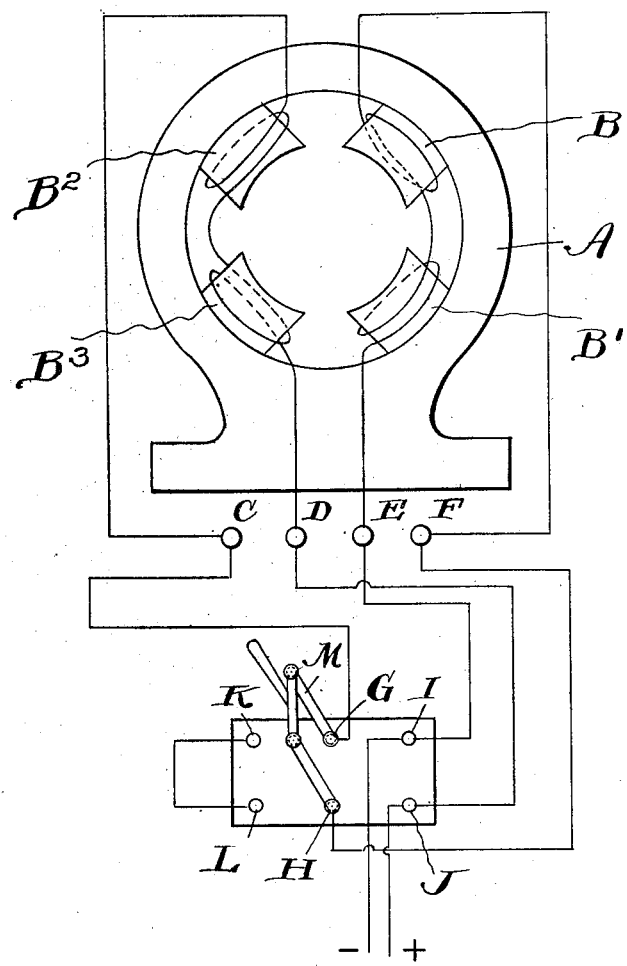

UNITED STATES PATENT OFFICE.

ARTHUR R. BULLOCK, OF CLEVELAND, OHIO, ASSIGNOR TO THE ERIE COIL COMPANY, OF CLEVELAND, OHIO, A CORPORATION OF OHIO.

METHOD OF RUNNING A SYNCHRONOUS MOTOR.

1,223,472. Specification of Letters Patent. Patented Apr. 24, 1917.

Application filed August 2, 1912, Serial No. 713,016. Renewed September 20, 1916. Serial No. 121,311.

*To all whom it may concern:*

Be it known that I, ARTHUR R. BULLOCK, a citizen of the United States, residing at Cleveland, in the county of Cuyahoga and State of Ohio, have invented a certain new and useful Improvement in Methods of Running a Synchronous Motor, of which the following is a full, clear, and exact description.

This invention relates to synchronous motors, or what may perhaps more properly be termed a method of operating synchronous motors.

In using a synchronous motor in connection with certain forms of alternating current apparatus, it is necessary that the motor run in absolute rotative position synchronism with the generator supplying the alternating current, and further, that the synchronous motor shall respond very readily to any changes in the angular velocity of the generator.

As one instance of such an alternating current machine as mentioned above, I would cite a mechanical converting device,— that is to say, a device comprising a commutator with segments thereon, arranged in groups, to which an alternating current may be fed, and which will deliver a direct current. Such machines must have the commutator thereof rotated by a motor rotating in precise synchronism with the generator from which the alternating current is generated,—that is to say, the rotors of the motor and generator must rotate as nearly in absolute step as it is possible to make them, and moreover, the commutator must be rotated so as to be in absolute synchronism with the generator of the alternating current at all times.

Normally, synchronous motors when operated in their usual manner, do not rotate in absolute angular synchronism with the A. C. generator. Therefore it is necessary to provide some way for their operation, which will provide this absolute synchronism, or to express it in another way,—the motor must rotate the commutator with such speed that the current waves passing through the commutator and through the motor must be absolutely in step.

I have found that this result may be accomplished by running the synchronous motor with the field excitation much below that which is the normal excitation, or in other words, running the motor so that the fields are excited only sufficient to prevent the motor from falling out of step.

The motor is usually started in the usual way, with the field excitation of the normal amount designed for the motor.

As a concrete illustration, we may take as an example, a one-half horse power synchronous motor, which may require a little over an ampere at 110 volts, or say 150 watts to excite the field, the motor itself requiring 625 watts, to operate at its rated capacity.

In running such a motor in the manner heretofore indicated, I would start the motor by using the normal field excitation,—that is to say 150 watts, and as soon as the motor was running synchronously and at proper speed, then the field excitation would be reduced to approximately 20 watts, in which condition, the motor would operate at its designed capacity, and would run absolutely free from any hunting.

Under the condition described, it has been found that the motor keeps in absolute synchronism with the generator whose alternating current it is using, and further, that the motor responds very quickly to any changes in frequency conditions, which may occur on the line.

So close is the regulation, I have found, that a given point upon the rotor of the motor does not vary $\frac{1}{32}$ of an inch on a 7 inch radius, from a similar point upon the generator rotor.

In the figure of the drawing, there is shown diagrammatically one way in which a synchronous motor may be operated in the manner described.

The motor frame is shown at A, and the pole pieces are indicated at B, B′, B² and B³. These pole pieces are wound so as to secure the proper field excitation, as indicated in the drawing, and the pole pieces on one side of the machine may be wound and connected in one circuit, while the pole pieces upon the other side of the machine, are wound in the opposite direction, and connected in a different circuit. The terminals of both circuits, may be connected with suitable binding posts, indicated at C, D, E and F. These binding posts will be connected with a double throw switch, the binding post C being connected with the point G of the switch, while the binding post F is connected with the point H of the switch. The binding post E will be connected with the point I of the switch, while the binding post D will be connected with the point J of the switch. The direct current with which the fields of the motor are excited will be connected through the proper leads, to the points I and J of the switch, the points K and L of the switch being short circuited.

When the knife blades M are in contact with the points I and J of the switch, then the windings upon the pole pieces B, B' are in parallel with the windings upon the pole pieces $B^2$ and $B^3$. Under such conditions, the current passing through the respective windings, will produce the normal full field excitation. This will be the condition under which the motor will be started.

When the motor is running at its proper speed, and in synchronism with the alternating current, the knife blades M will be thrown into contact with the points K and L. This change may be quickly made, and will not throw the motor out of step.

With the blades M contacting the points K and L, the windings upon the pole pieces B, B', $B^2$, and $B^3$, will be in series. In this manner, resistance will be introduced into the circuit producing the field excitation, and this resistance will cut down the flow of current through the windings, resulting in less field excitation than would be the case in the first condition described.

The windings upon the pole pieces may be so proportioned as to produce the proper field excitation under the starting condition, and the running condition.

The particular winding of the pole pieces just described is to be taken merely by way of illustration, and as in no way limitng the invention.

Having thus described my invention, what I claim is:

1. The method of operating a synchronous motor when the motor is running in synchronism, which consists in supplying the field windings of the motor with an amount of current which is just sufficient to keep the motor from falling out of step, regardless of the power factor of the exciting circuit.

2. The method of operating a synchronous motor, which consists in starting the motor with the normal field excitation and when the motor is running at proper speed, and in synchronism, reducing the field excitation considerably below the normal field excitation and continuously running the motor with the fields under excited, regardless of the change of power factor of the exciting circuit.

In testimony whereof, I hereunto affix my signature in the presence of two witnesses.

ARTHUR R. BULLOCK.

Witnesses:
A. J. HUDSON,
E. M. FREEMAN.